(12) United States Patent
Kwan et al.

(10) Patent No.: US 9,774,984 B2
(45) Date of Patent: Sep. 26, 2017

(54) REAL TIME ANALYTICS DRIVEN DECISIONING OF EDGE DEVICES IN A WIRELESS SENSOR NETWORK

(71) Applicant: International Business Machines Corporation, Armonk, NY (US)

(72) Inventors: Hung Tack Kwan, Grand Prairie, TX (US); Shiju Mathai, Carrollton, TX (US)

(73) Assignee: International Business Machines Corporation, Armonk, NY (US)

(*) Notice: Subject to any disclaimer, the term of this patent is extended or adjusted under 35 U.S.C. 154(b) by 691 days.

(21) Appl. No.: 13/735,002

(22) Filed: Jan. 6, 2013

(65) Prior Publication Data

US 2014/0192791 A1 Jul. 10, 2014

(51) Int. Cl.
*H04W 84/18* (2009.01)
*H04W 4/00* (2009.01)

(52) U.S. Cl.
CPC ............ *H04W 4/006* (2013.01); *H04W 84/18* (2013.01)

(58) Field of Classification Search
CPC ... H04W 88/16; H04W 4/006; H04W 40/005; H04W 40/32; H04W 28/06; H04W 84/18; H04L 67/12; H04L 45/26; G06F 15/16
USPC ....... 340/10.5; 370/338, 252, 254, 255, 216, 370/328, 336; 705/36 R; 707/603, 758; 709/223, 204; 717/173; 455/422.1
See application file for complete search history.

(56) References Cited

U.S. PATENT DOCUMENTS

| | | |
|---|---|---|
| 2006/0259616 A1 | 11/2006 | Lester |
| 2007/0273552 A1 | 11/2007 | Tischer |
| 2008/0238720 A1 | 10/2008 | Lee |
| 2010/0080175 A1 | 4/2010 | Kang et al. |
| 2011/0030875 A1 | 2/2011 | Conte et al. |
| 2011/0116416 A1 | 5/2011 | Dobson et al. |
| 2012/0300632 A1* | 11/2012 | Li et al. ................. 370/235 |
| 2014/0012799 A1* | 1/2014 | Eberlein et al. .......... 707/603 |

OTHER PUBLICATIONS

Zhang, Xuedan et al., "A Novel Real-Time Traffic Information System Based on Wireless Mesh Networks," IEEE Intelligent Transporation Systems Conf., Sep. 2007.

(Continued)

*Primary Examiner* — Charles C Jiang
*Assistant Examiner* — Wali Butt
(74) *Attorney, Agent, or Firm* — Steven M. Greenberg, Esq.; CRGO Law

(57) ABSTRACT

Embodiments of the invention provide a method, system and computer program product for real-time analytics driven decisioning of edge devices in a WSN. In an embodiment of the invention, a method for real-time analytics driven decisioning of edge devices in a WSN is provided. The method includes establishing a communicative connection by a controller with sensors in a geographically proximate WSN and aggregating data received from the sensors. The method also includes triggering an action in the controller based upon the aggregated data. Finally, the method includes propagating the aggregated data to a different controller communicatively coupled to other sensors of a different WSN geographically proximate to the different controller.

3 Claims, 2 Drawing Sheets

(56) References Cited

OTHER PUBLICATIONS

Lan, Kun-chan et al., "Experiences in Deploying a Wireless Mesh Network Testbed for Traffic Control," ACM SIGCOMM Computer Communication Review, vol. 37, No. 5, Oct. 2007.
Ahmed, H., et al., "A Wireless Mesh Network-Based Platform for ITS," IEEE Vehicular Technology Conference, May 11-14, 2008, pp. 3047-3051.

* cited by examiner

REAL TIME ANALYTICS DRIVEN DECISIONING OF EDGE DEVICES IN A WIRELESS SENSOR NETWORK

BACKGROUND OF THE INVENTION

Field of the Invention

The present invention relates to mesh network management and more particularly to decisioning in a mesh network Description of the Related Art Mesh networking refers to a multi-hop communications network in which the nodes of the network act as a router for data from other nodes. Consequently, a mesh network provides for continuous communicative connections between nodes and the ad-hoc reconfiguration of data paths throughout the network in response to broken or blocked paths. Mesh networks differ from other networks in that the component parts all connect to each other via multiple hops, and those component parts, in comparison to mobile ad-hoc networks, generally are not mobile. Of import, mesh networks are self-healing and can operate when one node fails or when a communicative linkage between nodes drops. As a result, mesh networks are known to be very reliable.

Mesh networks find substantial application in the field of remote sensing. Remote sensing refers to the acquisition of information of an object or phenomenon, by the use of either recording or real-time sensing device that is either wireless or not in physical or intimate contact with the object. In practice, remote sensing provides for the stand-off collection of data through the use of a variety of devices for gathering information on a given object or area. There are two main types of remote sensing: passive remote sensing and active remote sensing. In passive remote sensing, passive sensors detect natural wave emissions emitted or reflected by the target object or surrounding area. Active remote sensing, by comparison, utilizes active sensors that emit energy in order to scan objects and areas whereupon the sensors then detect and measure the reflected or backscattered radiation from the target.

A wireless sensor network (WSN) is a physical embodiment of a remote sensing system. A WSN primarily includes a selection of spatially distributed autonomous sensors cooperatively monitoring physical or environmental conditions, such as temperature, sound, vibration, pressure, motion or pollutants. In addition to one or more sensors, each node in a WSN is typically equipped with a radio transceiver or other wireless communications device, a microcontroller, and a power source, usually a battery. Of note, a WSN normally constitutes a wireless ad-hoc network, meaning that each sensor supports a multi-hop routing algorithm where nodes function as forwarders, relaying data packets to a base station.

Sensor platforms and devices have become more sophisticated with more processing power, and at the same time wireless mesh technology has become more pervasive. Yet, the contemporary traffic monitoring and analytics system coupled to the WSN at the back-end data center cannot operate fast enough to provide real time adjustments for vehicles on the move within the WSN. Such real time adjustments can only be done if processing of data can be performed done at the edge of the WSN.

BRIEF SUMMARY OF THE INVENTION

Embodiments of the present invention address deficiencies of the art in respect to processing data in a WSN and provide a novel and non-obvious method, system and computer program product for real-time analytics driven decisioning of edge devices in a WSN. In an embodiment of the invention, a method for real-time analytics driven decisioning of edge devices in a WSN is provided. The method includes establishing a communicative connection by a controller with sensors in a geographically proximate WSN and aggregating data received from the sensors. The method also includes triggering an action in the controller based upon the aggregated data. Finally, the method includes propagating the aggregated data to a different controller communicatively coupled to other sensors of a different WSN geographically proximate to the different controller.

In another embodiment of the invention, a data processing system is configured for real-time analytics driven decisioning of edge devices in a WSN. The system includes different WSNs, each with sensors sensing an environmental condition. The system also includes different controllers communicatively linked to one another, each executing in memory of a different computing device communicatively coupled to a geographically proximate one of the WSNs. Finally, the controllers each aggregate data received from the WSN, trigger an action based upon the aggregated data, and propagate the aggregated data to a different one of the controllers.

In one aspect of the embodiment, each of the controllers includes an analytics engine configured to reduce the aggregated data and a decisioning engine configured to trigger an action in the controller based upon the reduced aggregated data. In another aspect of the embodiment, each WSN is a mesh network of sensors and each of the sensors propagates sensed data to others of the sensors in the mesh network. In yet another embodiment of the invention, a back end data center is communicatively linked to each of the controllers and includes an analytics engine and a decisioning engine processing aggregated data received from each of the controllers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for real-time analytics driven decisioning of edge devices in a WSN. In an embodiment of the invention, different controllers can be positioned at different geographically positioned WSNs to form a mesh network. Each WSN can be directed to sensing a particular environmental condition. Further, each controller can include a processor and memory in which an analytics engine executes processing data received from proximate sensors in the WSN and also in which a decisioning engine can execute rules on the processed data. The results of the processing of the sensed data can be propagated to other controllers in the mesh network for use by the decisioning engine in the other controllers. In this way, decisioning on sensed data in the WSN can be performed rapidly at an edge of the WSN rather than requiring a propagation of the sensed data to a back end data center for processing.

Figure 1:
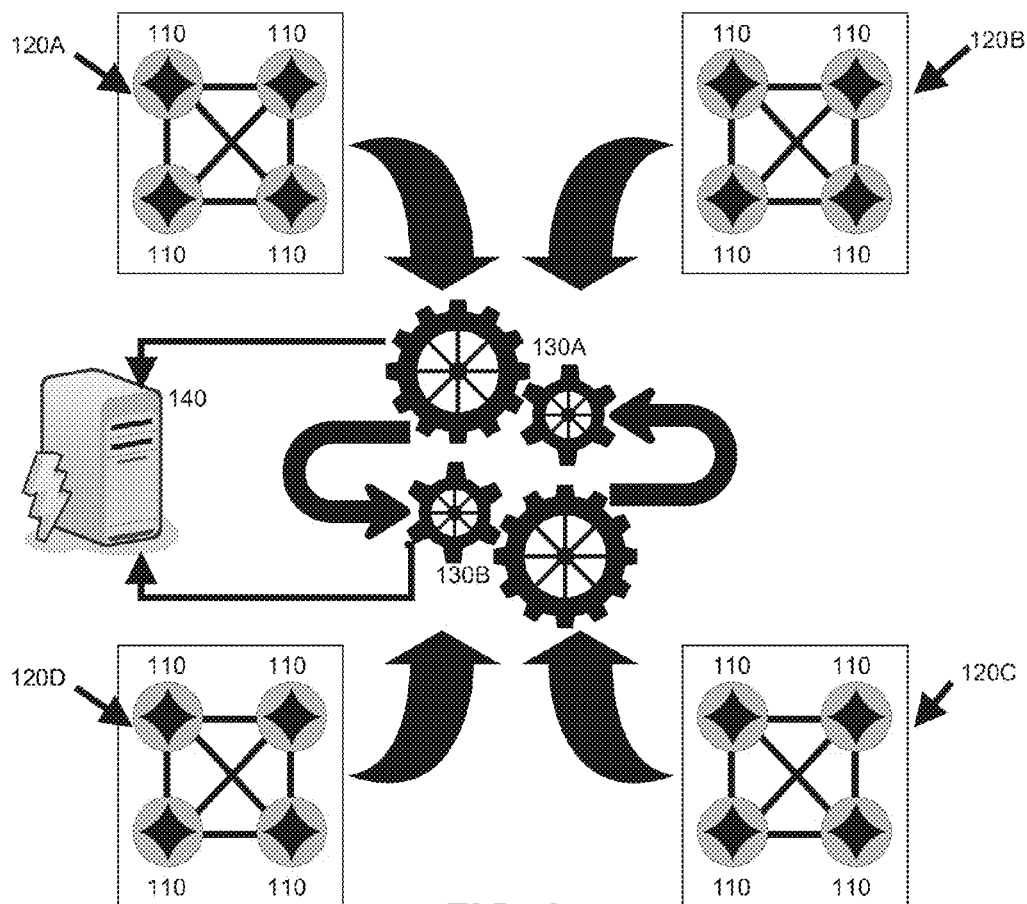
FIG. 1 is a pictorial illustration of a process for real-time analytics driven decisioning of edge devices in a WSN.

In further illustration, FIG. 1 is a pictorial illustration of a process for real-time analytics driven decisioning of edge devices in a WSN. As shown in FIG. 1, different controllers 130A, 130B can communicate with the sensors 110 of different WSNs 120A, 120B, 120C, 120D. The different controllers 130A, 130B additionally can communicate with each other, the combination of WSNs 120A, 120B, 120C, 120D and controllers 130A, 130B forming a mesh network. Each of the controllers 130A, 130B can include a local analytics engine enabled to process sensed data from the sensors 110 of the WSNs 120A, 120B, 120C, 120D, and also a decisioning engine configured to apply policies to the processed sensed data.

Each of the controllers 130A, 130B can be placed in geographic proximity to one or more of the WSNs 120A, 120B, 120C, 120D so that sensed data received in one of the controllers 130A, 130B from geographically proximate ones of the WSNs 120A, 120B, 120C, 120D can be processed at the edge of the mesh network within the one of the controllers 130A, 130B without requiring primary processing of the sensed data in the back end data center 140. Further, sensed data processed in one of the controllers 130A, 130B can be shared with the other of the controllers 130A, 130B for processing therein, again without requiring the primary processing of the sensed data in the back end data center 140. Yet, ultimately, the sensed data additionally can be provided to the back end data center 140 for supplemental processing of the sensed data.

Figure 2:
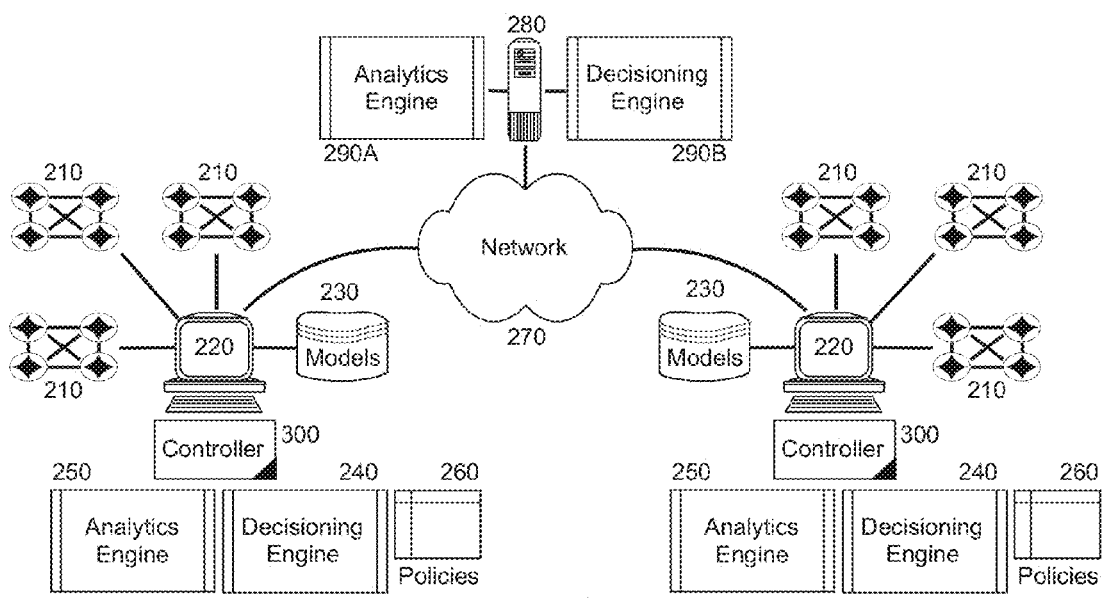
FIG. 2 is a schematic illustration of a data processing system configured for real-time analytics driven decisioning of edge devices in a WSN; and, FIG. 3 is a flow chart illustrating a process for real-time analytics driven decisioning of edge devices in a WSN.

The process described in connection with FIG. 1 can be implemented within a data processing system. In this regard, FIG. 2 schematically illustrated a data processing system configured for real-time analytics driven decisioning of edge devices in a WSN. The system can include different WSNs 210 disposed about a geographic area. Each of the sensors in the WSNs 210 can be a single function sensor configured to sense only one type of environmental data, for example temperature, motion, electronics state, pressure, voltage, sound, video, gas emissions, and the like. Each of the sensors in the WSNs 210 further can be configured to locate nearby sensors so as to form a mesh network and to propagate sensed data to the located nearby sensors in the mesh network.

Correspondingly different controllers 300 can execute in the memory of respective host computing devices 220 and can be coupled to one or more of the WSNs 210. The controllers host computing devices 220 in turn can be communicatively coupled both to one another over a computer communications network 270, and also to a server 280 supporting a back end data center including at least an analytics engine 290A and a decisioning engine 290B. Likewise, each of the controllers 300 can include an analytics engine 250 and a decisioning engine 240 acting upon processed sensed data provided by the analytics engine 250 using policies 260.

The controllers 300 each can include program code enabled to aggregate from different ones of the sensors of a coupled one of the WSNs 210 sensed data for processing in the analytics engine 250. The program code of the controllers 300 also can be enabled to apply one or more policies 260 to the processed sensed data so as to determine whether or not to trigger an action such as an audible or visible alert, or a transmission of a message to the server 280. In this regard, the decisioning engine 240 can compare the processed aggregation of sensed data to one or more different reference models 230 in order to determine whether or not to trigger one or more actions. Finally, the program code of the controllers 300 can be enabled to propagate processed sensed data to other, communicatively coupled ones of the controllers 300.

Figure 3:
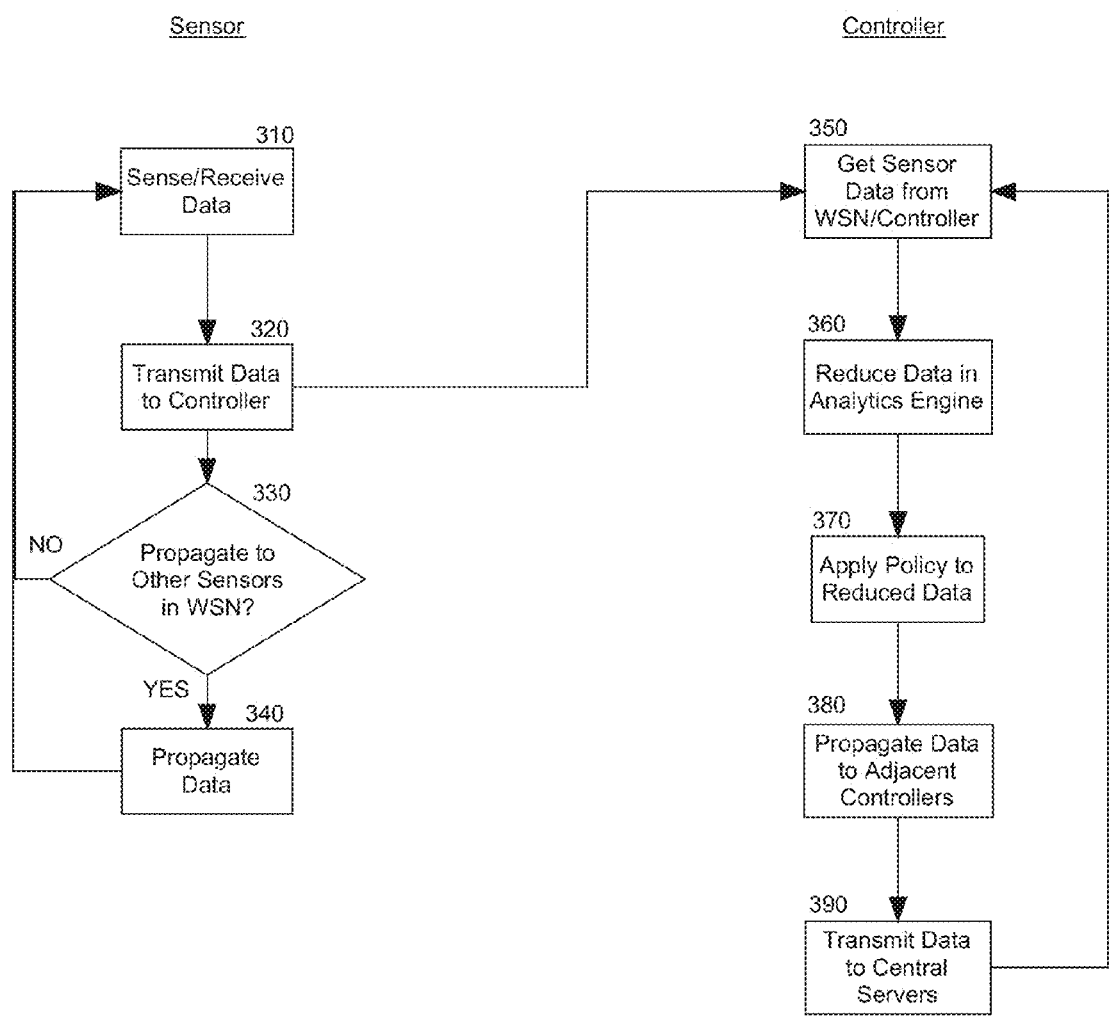

In even yet further illustration of the operation of the data processing system of FIG. 2, FIG. 3 is a flow chart illustrating a process for real-time analytics driven decisioning of edge devices in a WSN. Beginning in block 310, environmental data can be sensed in a smart sensor, or received from another smart sensor coupled thereto in a WSN. Optionally, the sensed data can be processed in the smart sensor in order to trigger an action without a requirement of intervention by a controller or back end data center. Nevertheless, in block 320, the sensed data can be transmitted to a geographically proximate controller and in decision block 330, it can be determined whether or not to propagate the sensed data to other sensors in the WSN. If so, in block 340, the data can be propagated to the other sensors of the WSN.

In block 350, with respect to a controller receiving sensed data from a sensor in the WSN, sensed data can be aggregated in memory of the controller and in block 360, the aggregated sensed data can be processed in a local analytics engine, for example in order to transform the raw data received in the aggregation to one or more pre-determined metrics, and in block 370 one or more policies can be applied to the reduced data in a decisioning engine local to the controller to determine whether or not to trigger an action, for example whether or not to display a message, transmit a message or sound an audible alert. In block 380, the reduced data also can be propagated to other communicatively coupled controllers. Finally, in block 390 the reduced data can be transmitted to a back end data center for supplemental processing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for real-time analytics driven decisioning of edge devices in a wireless sensor network (WSN);

establishing a communicative connection by a controller with a plurality of sensors in a geographically proximate WSN forming a mesh network;

communicatively linking the mesh network to a multiplicity of other controllers communicatively connected to sensors in other respectively geographically proximate WSNs also forming respectively different mesh networks;

executing in each of the controllers of each of the mesh networks both an analytics engine enabled to process sensed data from the sensors and also a decisioning engine configured to apply policies to the processed sensed data;

aggregating data received in each of the mesh networks from each of the sensors in a corresponding one of the controllers;

processing in each of the mesh networks the aggregated data by a corresponding analytics engine executing therein and applying a policy to the aggregated data by a corresponding decisioning engine executing therein so as to trigger an action in each of the corresponding ones of the controllers based upon the aggregated data;

propagating the aggregated data from each of the controllers to at least one different one of the controllers; and, transmitting the aggregated data received in each of the controllers from each of the controllers in a corresponding one of the mesh networks to a back end data center.

2. A data processing system configured for real-time analytics driven decisioning of edge devices in a wireless sensor network (WSN);

different WSNs forming respectively different mesh networks, each comprising a plurality of sensors sensing an environmental condition; and, a plurality of controllers communicatively linked to one another, each disposed in one of the mesh networks and executing in memory of a different computing device communicatively coupled to a geographically proximate one of the WSNs, each further executing in the memory both an analytics engine enabled to process sensed data from the sensors and also a decisioning engine configured to apply policies to the processed sensed data;

the controllers each aggregating data received from the WSN from corresponding ones of the sensors, processing the aggregated data by a corresponding analytics engine executing therein and applying a policy to the aggregated data by a corresponding decisioning engine executing therein so as to trigger an action therein, and propagating the aggregated data to at least one different one of the controllers in a different one of the mesh networks, and transmitting the aggregated data to a back end data center.

3. A computer program product for real-time analytics driven decisioning of edge devices in a wireless sensor network (WSN), the computer program product comprising:

a computer readable storage medium comprising a device having computer readable program code embodied therewith, wherein the computer readable storage medium is not a transitory signal per se, the computer readable program code comprising:

computer readable program code for establishing a communicative connection by a controller with a plurality of sensors in a geographically proximate WSN forming a mesh network;

computer readable program code for communicatively linking the mesh network to a multiplicity of other controllers communicatively connected to sensors in other respectively geographically proximate WSNs also forming respectively different mesh networks;

computer readable program code for executing in each of the controllers of each of the mesh networks both an analytics engine enabled to process sensed data from the sensors and also a decisioning engine configured to apply policies to the processed sensed data;

computer readable program code for aggregating data received in each of the mesh networks from each of the sensors in a corresponding one of the controllers;

computer readable program code for processing in each of the mesh networks the aggregated data by a corresponding analytics engine executing therein and applying a policy to the aggregated data by a corresponding decisioning engine executing therein so as to trigger an action in each of the corresponding ones of the controllers based upon the aggregated data;

computer readable program code for propagating the aggregated data from each of the controllers to at least one different one of the controllers; and, transmitting the aggregated data received in each of the controllers from each of the controllers in a corresponding one of the mesh networks to a back end data center.

* * * * *